(12) United States Patent
Kwan et al.

(10) Patent No.: US 9,717,010 B2
(45) Date of Patent: Jul. 25, 2017

(54) LOAD ESTIMATION AND LOAD MANAGEMENT IN A CELLULAR COMMUNICATIONS NETWORK

(71) Applicant: UBIQUISYS LIMITED, Swindon, Wiltshire (GB)

(72) Inventors: Raymond Kwan, Swindon (GB); Colin Kellett, Malborough (GB)

(73) Assignee: UBIQUISYS LIMITED, Swindon, Wiltshire (GB)

(*) Notice: Subject to any disclaimer, the term of this patent is extended or adjusted under 35 U.S.C. 154(b) by 0 days.

(21) Appl. No.: 15/012,016

(22) Filed: Feb. 1, 2016

(65) Prior Publication Data

US 2016/0165485 A1    Jun. 9, 2016

Related U.S. Application Data

(63) Continuation of application No. 14/088,165, filed on Nov. 22, 2013, now Pat. No. 9,374,726.

(30) Foreign Application Priority Data

Nov. 29, 2012    (GB) .................................. 1221519.0

(51) Int. Cl.
    *H04W 24/08*         (2009.01)
    *H04W 72/04*         (2009.01)
    (Continued)

(52) U.S. Cl.
    CPC ....... *H04W 24/08* (2013.01); *H04W 28/0252* (2013.01); *H04W 28/08* (2013.01);
    (Continued)

(58) Field of Classification Search
    CPC ..... H04W 24/08; H04W 28/08; H04W 72/04; H04W 52/343; H04W 52/346; H04W 28/0252
    See application file for complete search history.

(56) References Cited

U.S. PATENT DOCUMENTS

| 9,374,726 B2 | 6/2016 | Kwan et al. |
| 2002/0077111 A1 | 6/2002 | Spaling et al. |

(Continued)

FOREIGN PATENT DOCUMENTS

| GB | 2496908 | 5/2013 |
| GB | 2508381 | 6/2014 |
| WO | WO2008/135583 | 11/2008 |

OTHER PUBLICATIONS

UKIPO May 14 2013, Patents Act 1977: Search Report under Section 17, GB Application No. GB1221519.0, 1 page.

(Continued)

*Primary Examiner* — Thai Vu
(74) *Attorney, Agent, or Firm* — Patent Capital Group

(57) ABSTRACT

A cellular communications network 10 comprises a plurality of basestations 12, 14, 16 and 18 connected to each other through an interface and to a core network through another interface. Each basestation has a coverage area referred to as a cell k. There are provided methods for estimating the load imparted on a cell in the cellular communications network by user equipments in the cell. The methods make it possible to estimate any potential increase in the load that may impact onto a target cell due to the handover of a UE from a serving cell.

20 Claims, 6 Drawing Sheets

(51) Int. Cl.
*H04W 28/02* (2009.01)
*H04W 28/08* (2009.01)
*H04W 52/34* (2009.01)

(52) U.S. Cl.
CPC .......... *H04W 72/04* (2013.01); *H04W 52/343* (2013.01); *H04W 52/346* (2013.01)

(56) References Cited

U.S. PATENT DOCUMENTS

| | | |
|---|---|---|
| 2004/0053630 A1 | 3/2004 | Ramos et al. |
| 2005/0265299 A1 | 12/2005 | Franceschini et al. |
| 2007/0127522 A1 | 6/2007 | Lundh et al. |
| 2009/0245329 A1* | 10/2009 | Bocquet .............. H04W 52/346 375/146 |
| 2012/0270593 A1 | 10/2012 | Park |
| 2012/0302244 A1 | 11/2012 | Sridhar |
| 2014/0148149 A1 | 5/2014 | Kwan et al. |
| 2016/0150442 A1 | 5/2016 | Kwan et al. |

OTHER PUBLICATIONS

Nov. 12, 2015 Notice of Allowance from U.S. Appl. No. 14/088,165.

Bruce, M. Melvin, "Estimation of Variance by a Recursive Equation," Langley Research Center Langley Station, Hampton, VA, National Aeronautics and Space Administration Washington, D.C., Oct. 1969; 31 pages.

USPTO Sep. 29, 2016 Non-Final Office Action from U.S. Appl. No. 15/012,148.

\* cited by examiner

LOAD ESTIMATION AND LOAD MANAGEMENT IN A CELLULAR COMMUNICATIONS NETWORK

CLAIM OF PRIORITY

This application is a continuation (and claims the benefit of priority under 35 U.S.C. §120) of U.S. application Ser. No. 14/088,165, filed Nov. 22, 2013, entitled "LOAD ESTIMATION AND LOAD MANAGEMENT IN A CELLULAR COMMUNICATIONS NETWORK," Inventors Raymond Kwan et al., which claims priority from the patent application filed in the United Kingdom on Nov. 29, 2012, having Application Serial No. GB 1221519.0 entitled "LOAD ESTIMATION AND LOAD MANAGEMENT IN A CELLULAR COMMUNICATIONS NETWORK," which is hereby incorporated by reference in its entirety.

TECHNICAL FIELD

This disclosure relates to load estimation and load management in a cellular communications network, and in particular to methods and systems for load estimation and load management in a Long Term Evolution (LTE) network.

BACKGROUND

The estimation of the load of a network is an important aspect of LTE, and is relevant in the context of admission control, congestion control, and load balancing. The disclosure is particularly, though not necessarily exclusively, relevant to load estimation and load management in a network comprising basestations in a small cell, or femtocell basestations.

Load management is an important aspect for consideration in a wireless network. If the load of a network is not managed properly (for example, where there are too many user equipments (UEs) in a cell), the quality of service (QoS) experienced by the UEs connected to that network will be poor because many UEs would be forced to share limited resources. The system could manage this by allowing only a small number of UEs to be admitted to the network so that each UE experiences a good quality of service. However, this would result in the network being under-utilised. It is thus important to effectively estimate and manage the load of the system.

In this respect, one key issue to be addressed is the accurate estimation of the load of a particular cell. The simplest way to estimate the load of a cell is to count the number of UEs in the system. This approach roughly reflects the level of input traffic admitted by the system. In particular, a cell that has a higher number of UEs will be supporting a higher load. However, this estimation does not take into account system resource or quality of service requirements. For example, the estimation does not take into account the fact that UEs with relaxed quality of service requirements may occupy fewer system resources than those with more stringent requirements. The estimate is thus not particularly accurate.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION OF EXAMPLE EMBODIMENTS

Figure 1:
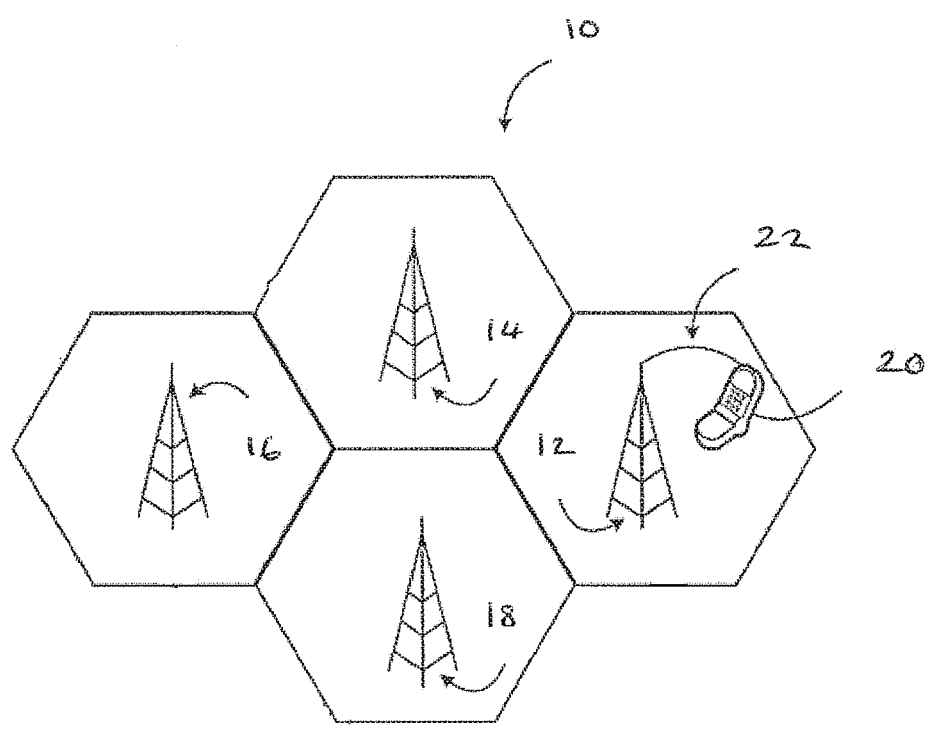
FIG. 1 illustrates a cellular communications network, in accordance with the disclosure.

A more refined way to estimate the load of a cell is to compute the average number of resource blocks used relative to the total number of resources blocks available. However, this approach is sensitive to traffic characteristics, and is thus especially not suitable for best effort traffic because the load tends to be overestimated, which would cause inefficient use of resources.

An improved way to estimate the load of a cell is to obtain the required number of resource blocks per UE based on the ratio of the required bit rate and the spectral efficiency per resource block of the UE and to then normalize this quantity by the total number of resource blocks in the system bandwidth, and sum over all active UEs in the system. However, such an estimate is based on the assumption of constant power spectral density, with fixed power allocation across the entire bandwidth. This assumption is only valid when frequency-selective power control is not used. Therefore, this approach could potentially underestimate the load in the presence of power control across the bandwidth, i.e. where each sub-band can potentially take on a different power level. The reason for this is that power is non-uniformly distributed across the sub-bands, and thereby the usability of some sub-bands is reduced. In other words, it is possible that power is concentrated to a subset of the sub-bands for the sake of dynamic frequency reuse. This selective usability of sub-bands may cause a potential under-estimation of the cell load if cell load is based on the frequency utilization. While such an assumption is valid for traditional or early LTE networks, it may not be applicable when dynamic frequency reuse and power adaptation is taken into account.

There is therefore a need for an improved method for estimating the load of a cell.

The load contribution due to each UE of a network can vary considerably due to varying channel qualities as a result of channel fading and mobility. In the case of a macro cell, the total load is averaged over a large number of UEs, thereby allowing a relatively stable load estimation to be made. However, in a small cell (a femto cell), where the number of UEs is more limited, the channel variation of each UE will play a more significant role in the load estimate, and more load variation can be observed. Thus, the system needs to be able to cope with such load fluctuation, and some existing UEs may need to be dropped, if necessary.

Some existing systems perform dynamic load balancing to optimise throughput whereby each cell hands over UEs to a more suitable neighbour cell based on a combination of the knowledge of the local cell throughput and the cell load deviation from the average network load. However, an assumption has to be made that each UE can only be allocated a single resource block at a time within the cell, and that the global load information is available to each cell. In this scheme, the load is estimated as the fraction of occupied resource blocks relative to the total number of resource blocks.

In some systems, load balancing is performed by modifying the cell-specific offsets for neighbour cells. In particular, when the load difference between the serving cell and a specific neighbour cell is smaller than a specific threshold, the neighbour cell offset is increased. When the difference is larger than the same threshold, the neighbour cell offset is decreased. In this scheme, the load is related to the resource blocks utilisation needed to meet a certain required target relative to the overall resource block availability. Once a handover decision is made at the serving cell, it is the responsibility of the neighbour cell to decide whether the admission of a UE from the serving cell to that neighbouring cell can be granted.

The handover decision could be based on a number of factors including: determining whether a subset of neighbour cells have low loads, determining whether a subset of UEs are good candidates for handover to the selected subset of neighbour cells based on their link qualities, information regarding the available resources of the target cell, and estimating the resource blocks that would be required if the selected UE were handed over to the target cell.

The selection of a particular UE for handover from the serving cell to a neighbour cell could include selecting a UE if the path gain between that UE and the neighbour cell is greater than the path gain between any of the other UEs in the serving cell and that neighbour cell. However, the impact of the Signal-to-Interference and Noise Ratio (SINR) of the UE that would occur if handover was carried out is not considered in the handover decision. Therefore, it is possible that the basestation of the serving cell would generate a high interference in the target cell for the UE selected for the handover, which would cause the resulting SINR of the UE to degrade significantly.

Some existing approaches have considered how the SINR of the UE would be affected at the target basestation if the potential handover were to occur. In these approaches, the interference due to the respective basestations is modified accordingly. However, these approaches do not take into account the power-based dynamic frequency reuse, where the downlink transmit power is sub-band specific, i.e. where the power level can vary depending on the location of the sub-band.

There is therefore also the need for an improved method for handover that effectively manages the load of a network (or, more particularly, that balances the loads of a network) and that effectively manages the interference that may be experienced by UEs that are to take part in a handover.

Overview

In accordance with aspects of the disclosure, the above problems are solved by providing mechanisms in which the load of a cell is estimated taking into account the quality of service experienced by the UEs and the actual power utilization. In particular, the load of a cell is defined as the required rate per unit power relative to the actual rate per unit power.

The disclosure provides an improved method for estimating the load of a cell for the purpose of load balancing in general and, more particularly, for the purpose of radio admission control and congestion control for LTE networks. The disclosure balances the load of a cell to ensure that the load is stabilised by quantifying the variation in the load based on an observed load variance, and by adapting a filter coefficient of an averaging filter of the load based on the level of observed variation.

The improved estimation of the load means that radio resources of a cell in the network can be more efficiently allocated, which allows a serving cell to determine the amount of traffic that can be supported. In this way, system performance is improved while a good quality of service for the UEs is maintained.

In view of the way in which the load is estimated by the disclosure in the context of load balancing, it is also possible to estimate any potential increase in the load. Specifically, it is possible to estimate any potential increase in the load that may impact onto the target cell due to the handover of a UE from the serving cell. This enables the serving cell to select the most suitable target cell for a particular UE, thereby improving the overall network efficiency.

Furthermore, the disclosure allows the load to be estimated even when the power allocation is different across the frequency band.

According to a first aspect of the present disclosure, there is provided a method for estimating the load imparted on a cell in a cellular communications network by user equipments in the cell, the method comprising:

calculating the average power of the cell;

calculating the bit rate achieved for each currently scheduled user equipment in the cell;

estimating a current value of the load imparted on the cell as the sum of the required bit rates for each currently scheduled user equipment in the cell divided by the sum of the calculated achieved bit rates for each user equipment in the cell, multiplied by the calculated average power of the cell divided by the maximum power available in the cell.

According to a second aspect of the disclosure, there is provided a method for estimating the load imparted on a cell in a cellular communications network by user equipments in the cell, the method comprising:

calculating the average power of the cell;

calculating the bit rate achieved for each currently scheduled user equipment in the cell;

estimating a current value of the load imparted on the cell as the sum, taken over each user equipment in the cell, of the required bit rate for the user equipment divided by the calculated achieved bit rate for the cell, with the sum multiplied by the calculated average power of the cell divided by the product of the maximum power available in the cell and the number of currently scheduled user equipments in the cell.

According to a third aspect of the disclosure, there is provided a method for estimating the load imparted on a cell in a cellular communications network by user equipments in the cell, the method comprising:

calculating the load imparted on the cell by each user equipment;

calculating a weighted load for each user equipment by multiplying the calculated load by a predetermined weight;

estimating a current value of the load imparted on the cell as the sum of the calculated weighted load for each user equipment.

According to a forth aspect of the disclosure, there is provided a basestation configured to operate in accordance with the method of one of the aspects of the disclosure.

Example Embodiments

FIG. 1 shows a part of a cellular communications network 10. The network 10 comprises a plurality of basestations 12, 14, 16 and 18 (in particular, a plurality of evolved NodeBs). The basestations 12, 14, 16, and 18 are connected to each other through an interface (in particular, an X2 interface) and to a core network (CN) through another interface (in particular, an S1 interface). A merely representative hexagonal grid is shown to represent the coverage area (also referred to as a cell k) of the basestations 12, 14, 16 and 18. In another example, the basestations are small cell basestations that are located within a grid, providing coverage over an area such as a campus, or the like, in which case the basestations might be connected to each other through a local area network, and might be connected to the core network over a public wide area network such as the internet.

The basestations 12, 14, 16 and 18 communicate with user equipment devices (UEs) via wireless links. For example, basestation 12 communicates with UE 20 via a wireless link 22. Signals are transmitted via the wireless link 22 from the basestation 12 to the UE 20 (i.e. downlink) or from the UE 20 to the basestation 12 (i.e. uplink).

A bearer is established between a basestation and a UE for the transmission of data packets. A bearer is an Internet Protocol (IP) packet flow with a defined quality of service (QoS). Multiple bearers can be established for a UE in order to provide different QoS. In this way, a UE could use different applications simultaneously by establishing different bearers for those applications. For example, a UE could establish one bearer for a Voice over IP (VoIP) call while, at the same time, the UE could also establish a separate bearer for Internet browsing. The VoIP bearer would provide the necessary QoS for the voice call, while the Internet bearer would provide the necessary QoS for the Internet browsing.

The load $\rho_k$ of a cell k is estimated as the required bit rate per unit power relative to the actual bit rate per unit power. More particularly, as disclosed in earlier UK Patent Application No. 1120462.5, the load imparted on a cell k by a user equipment i in the cell k is estimated as the required bit rate for the user equipment i divided by the average bit rate achieved by the user equipment i multiplied by the average power of the user equipment i divided by a predetermined maximum downlink power for the cell k, and the load $\rho_k$ of the cell k is estimated by summing the estimated load imparted on the cell k by each user equipment i in the cell k.

This can be expressed as:

$$\rho_k = \sum_i \frac{\tilde{R}_{k,i}}{\overline{R}_{k,i}} \frac{\overline{P}_{k,i}}{\tilde{P}_k}, \qquad (1)$$

where $\tilde{R}_{k,i}$ is the bit rate required by the specified QoS for UE i in cell k, $\overline{R}_{k,i}$ is the actual average bit rate used by UE i in cell k or the average bit rate that can be achieved by UE i in cell k, $\overline{P}_{k,i}$ is the average power for UE i in cell k, and $\tilde{P}_k$ is the maximum downlink power limit for cell k. In other words, the load $\rho_k$ of the cell k is calculated by summing the individual loads of each UE i in the cell k and the load of each UE i in the cell k is the ratio of the required power efficiency to the power efficiency of UE i. As mentioned above, it is possible for a UE to have multiple bearers. In this case, it is more useful to define i as the index of the bearer in the system.

Referring to Equation (1), the quantity $$\mu_{k,i} = \frac{\overline{R}_{k,i}}{\overline{P}_{k,i}}$$

can be interpreted as the average bit rate per unit power, which quantifies the power efficiency of the UE i. Thus, the quantity $$\frac{\tilde{R}_{k,i}}{\mu_{k,i}}$$

refers to the power required to achieve the required bit rate. Subsequently, the required power normalized by the total power gives the relative required power contribution of the UE within the system.

In practice, it is possible for a UE or a bearer to achieve a very low bit rate, thereby causing a high load fluctuation. To overcome this high load fluctuation, the load $\rho_k$ of a cell k is estimated as:

$$\rho_k = \sum_i \min\left(C_i, \frac{\tilde{R}_{k,i}}{\overline{R}_{k,i}}\right) \frac{\overline{P}_{k,i}}{\tilde{P}_k}, \qquad (2)$$

where a predetermined positive constant $C_i$ is used to limit the large bit rate ratio, and reduce the potential instability. In other words, if the required bit rate for the user equipment i divided by the calculated average bit rate achieved by the user equipment i is more than the predetermined positive constant $C_i$, the load imparted on the cell k by the user equipment i is estimated as the predetermined positive constant $C_i$ multiplied by the calculated average power of the user equipment i divided by a predetermined maximum downlink power for the cell k.

In order to reduce the level of variation in the estimate of the load due to channel variation and traffic variation, some averaging needs to be performed. This averaging is performed at the basestation itself since the basestation has the information required (such as the QoS requirements, power, average bit rate, etc) to perform the averaging. The averaging is achieved by means of an averaging filter. The averaging filter has an associated filter coefficient that can be adjusted in order to reduce the rate of change.

According to one aspect of the disclosure, the load $\rho_k$ defined in Equations (1) or (2) can be expressed as:

$$\rho_k(t) = (1-\beta)\rho_k(t-1) + \beta \frac{P_k(t)}{\tilde{P}_k |\Lambda(t)|} \sum_{i \in \Lambda(t)} \frac{\tilde{R}_{k,i}}{\overline{R}_{k,i}(t)}, \qquad (3)$$

where $\tilde{R}_{k,i}$ is the required bit rate for each UE i in the cell k, $\overline{R}_{k,i}$ is the achieved bit rate for each UE i in the cell k, $P_k(t)$ is the average downlink transmit power of the cell k at time t, $\tilde{P}_k$ is the maximum power available in the cell k, $\beta$ is a predetermined filter coefficient selected for the averaging filter that is employed, $\Lambda(t)$ is the set of user equipments that are being scheduled at time t, and $|\Lambda(t)|$ is the size of the set $\Lambda(t)$ of user equipments that are being scheduled at time t, i.e. the number of user equipments that are being scheduled at time t.

For example, $\Lambda(t)=\{1, 3, 7, 8\}$ refers to the set of user equipments with IDs of 1, 3, 7, and 8. Thus, the size of the set $\Lambda(t)=\{1, 3, 7, 8\}$ is 4, i.e. 4 user equipments are scheduled. As mentioned above, it is possible for a user equipment to have multiple bearers. Therefore, the set $\Lambda(t)$ could refer to the set of bearers across the entire cell k. For simplicity, it is assumed that each user equipment has only one bearer such that the set $\Lambda(t)$ refers to the set of user equipments. However, it should be noted that the term "user equipment" ("UE") could be replaced with the term "bearer" when considering the case where a user equipment has multiple bearers.

Also, in Equation (3), $\rho_k(t-1)$ represents a previous value of the load imparted on the cell k and $$\frac{P_k(t)}{\tilde{P}_k |\Lambda(t)|} \sum_{i \in \Lambda(t)} \frac{\tilde{R}_{k,i}}{\overline{R}_{k,i}(t)}$$

represents the current value of the load imparted on the cell k.

The value of the predetermined filter coefficient $\beta$ is normally fixed, if averaging is performed, and is selected by an operator. However, in accordance with the disclosure, the value of $\beta$ is adjusted according to the amount of variation in the load. The value of $\beta$ will be between 0 and 1. A value of $\beta$ that is close to 1 will emphasize the current value of the load and will provide a faster response time. Conversely, a smaller value of $\beta$ will provide smoother filtering, but the response time will be slower.

The average bit rate $\overline{R}_{k,i}$ for UE i in cell k can be expressed as:

$$\overline{R}_{k,i}(t) = \begin{cases} (1-\alpha)\overline{R}_{k,i}(t-1) + \alpha\hat{R}_{k,i}(t), & \text{if } i \in \Lambda(t) \\ (1-\alpha)\overline{R}_{k,i}(t-1), & \text{if } i \notin \Lambda(t) \end{cases} \quad (4)$$

where $\overline{R}_{k,i}(t-1)$ represents a previous value of the average bit rate calculated for a user equipment, $\hat{R}_{k,i}(t)$ is the current bit rate allocated to the user equipment, $\Lambda(t)$ is the set of scheduled user equipments, and $\alpha$ is another filter coefficient.

The value of $\alpha$ is chosen based on an estimate of the average bit rate for the user. The value of $\alpha$ is normally fixed, if averaging is performed, and is selected by an operator. However, in accordance with the disclosure, the value of $\alpha$ may be adjusted. The value of $\alpha$ will be between 0 and 1. For example, a typical value of $\alpha$ could be 0.01. Unless the value of $\alpha$ is quite large, the value of a does not significantly impact the estimate of the load. Therefore, it is often more effective to adjust the other filter coefficient $\beta$.

According to Equation (4), if the user equipment is not currently scheduled (i.e. if $i \notin \Lambda(t)$), then the bit rate achieved for the user equipment $\overline{R}_{k,i}(t)$ is calculated as a fraction $(1-\alpha)$ taken of a previous value of the bit rate achieved for the user equipment $\overline{R}_{k,i}(t-1)$. On the other hand, if the user equipment is currently scheduled (i.e. if $i \in \Lambda(t)$), then the average bit rate calculated for the user equipment $\overline{R}_{k,i}(t)$ is calculated as the sum of a fraction $(1-\alpha)$ taken of a previous value of the average bit rate calculated for the user equipment $\overline{R}_{k,i}(t-1)$ and a fraction a taken of the current bit rate allocated to the user equipment $\hat{R}_{k,i}(t)$.

It can be seen in Equation (4) that the bit rate for UE i reduces if it is not scheduled, and increases if it is scheduled. Subsequently, when the UE i is next scheduled, the load contribution from UE i would be higher.

In another aspect of the disclosure, the load $\rho_k$ can be expressed as:

$$\rho_k(t) = (1-\beta)\rho_k(t-1) + \beta\frac{\tilde{\eta}_k}{\eta_k} \quad (5)$$

where $\tilde{\eta}_k = \frac{\tilde{R}_k}{\tilde{P}_k}, \eta_k \frac{\overline{R}_k(t)}{P_k(t)},$ $\overline{R}_k(t) = \frac{1}{|\Lambda(t)|} \sum_{i \in \Lambda(t)} \overline{R}_{k,i}(t),$ and $\tilde{R}_k(t) = \frac{1}{|\Lambda(t)|} \sum_{i \in \Lambda(t)} \tilde{R}_{k,i}.$ Here, $\overline{R}_k(t)$ is the sum of the respective achieved bit rates for each UE i that is currently scheduled in the cell k divided by the number of UEs that are currently scheduled and $\tilde{R}_k(t)$ is the sum of the respective required bit rates for each UE i that is currently scheduled in the cell k divided by the number of UEs that are currently scheduled. Also, $P_k(t)$ is the average transmit power of the cell k and $\tilde{P}_k$ is the maximum power available in the cell k.

The quantity $\tilde{\eta}_k$ is the sum of the required bit rate for each currently scheduled UE i in the cell k divided by the number of currently scheduled UEs per maximum unit of available power in the cell k, i.e. the quantity $\tilde{\eta}_k$ is the average bit rate required for the cell k per maximum unit of available power $\tilde{P}_k$ in the cell k.

The quantity $\eta_k$ is the sum of the bit rate achieved for each currently scheduled UE i in the cell k divided by the number of currently scheduled UEs per average power of the cell k i.e. the quantity $\eta_k$ is the average bit rate achieved over all currently scheduled user equipments i in the cell k per average power of the cell k. This achieved bit rate is calculated according to Equation (4).

Therefore, the ratio $$\frac{\tilde{\eta}_k}{\eta_k}$$

in Equation (5) is calculated based on the average bit rates (required/achieved) over all UEs i in the cell k. In fact, the quantity $\tilde{\eta}_k$ corresponds to the required power efficiency for cell k, and the quantity $\eta_k$ corresponds to the efficiency achieved for cell k. The ratio $$\frac{\tilde{\eta}_k}{\eta_k}$$

represents the current value of the load imparted on the cell k.

Also, $\rho_k(t-1)$ represents a previous value of the load imparted on the cell k and $\beta$ is a predetermined filter coefficient.

According to Equation (5), a current value of the load imparted on the cell $\rho_k(t)$ is calculated as the sum of the required bit rates for each currently scheduled user equipment in the cell $\tilde{R}_k(t)$ divided by the sum of the calculated achieved bit rates for each currently scheduled user equipment in the cell $\overline{R}_k(t)$, multiplied by the calculated average power of the cell $P_k(t)$ divided by the maximum power available in the cell $\tilde{P}_k$.

It is noted that the sum of the required bit rates for each currently scheduled user equipment in the cell $\tilde{R}_k(t)$ and the sum of the calculated achieved bit rates for each currently scheduled user equipment in the cell $\overline{R}_k(t)$ are divided by the number of currently scheduled user equipments in the cell $|\Lambda(t)|$. However, in view of the division of the sum of the required bit rates for each currently scheduled user equipment in the cell $\tilde{R}_k(t)$ by the sum of the calculated achieved bit rates for each currently scheduled user equipment in the cell $\overline{R}_k(t)$ in Equation (5), the division by the number of currently scheduled user equipments in the cell $|\Lambda(t)|$ cancels and thus does not need to be considered in the calculation of the load imparted on the cell according to Equation (5).

The system generally supports the UEs comfortably when the actual bit rate (i.e. the bit rate that the system can support based on, for example, the channel quality of the UE and the load of the system) per unit power $\eta_k$ is higher than the required bit rate per unit power $\tilde{\eta}_k$. The more UEs there are in the system, the more the fixed frequency and power resources of the system would need to be shared among these UEs. This means that each UE would be allocated less resources, resulting in a lower bit rate for that UE. However, the fact that the actual bit rate per unit power $\eta_k$ is higher than the required bit rate per unit power $\tilde{\eta}_k$ means that the UE can still enjoy a high bit rate. In particular, a high actual bit rate relative to the required bit rate means that the UE will experience a bit rate that is higher than the required bit rate.

If the actual average bit rate per unit power is high, it means that the current power transmitted in the system would already provide a high bit rate and the power efficiency would be expected to be high. On the other hand, if the required bit rate per total available power is low, the system requires only a low power efficiency compared to that which is actually achieved and so the system could potentially support more traffic.

As an alternative to the load estimation methods of Equations (3) and (5), which estimate the current value of the load based on the number of UEs that are currently scheduled, the current value of the load could instead be estimated based on the number of active UEs in the cell. For example, the load estimation method defined by Equation (3) would then be written as:

$$\rho_k(t) = (1-\beta)\rho_k(t-1) + \beta \frac{P_k(t)}{\tilde{P}_k |N(t)|} \sum_{i \in N(t)} \frac{\tilde{R}_{k,i}}{\overline{R}_{k,i}(t)}, \quad (3a)$$

where N(t) is the set of UEs that are active at time t, i.e. the number of UEs that are active at time t. An active UE is a UE that has an active radio connection. It should be noted that an active UE is not necessarily a scheduled UE. Rather, an active UE could be a UE that has data to send and that is waiting for a transmission opportunity, but may or may not be scheduled at time instance t due to a scheduling policy.

Similarly, the load estimation method defined by Equation (5) would include alternative definitions for the average bit rate achieved in the cell $\overline{R}_k(t)$ and the average bit rate required for the cell $\tilde{R}_k(t)$, which would be given by:

$$\overline{R}_k(t) = \frac{1}{|N(t)|} \sum_{i \in N(t)} \overline{R}_{k,i}(t) \text{ and } \tilde{R}_k(t) = \frac{1}{|N(t)|} \sum_{i \in N(t)} \tilde{R}_{k,i}$$

respectively.

The load of the cell can be stabilised by introducing a limiting factor, which can be expressed as:

$$\rho_k(t) \leftarrow \min(C_k, \rho_k(t)) \quad (6)$$

It is said that when the load reaches the maximum (i.e. in the case of a full load), the load achieves unity. However, in practice, it is beneficial to keep the load well below unity in order to take into account variations among the UEs within the cell.

In another aspect of the disclosure, the load $\rho_k$ of a cell k is estimated as a weighted sum of the load contribution from the individual bearers or UEs according to their priorities. This can be expressed as:

$$\rho_k = \sum_i w_{k,i} \rho_{k,i} \quad (7)$$

where $\rho_{k,i}$ is the load contribution from UE i, and $w_{k,i}$ is a predetermined positive weight.

If UE i is of a low priority, it is possible to serve the UE on a best-effort basis. In this case, resources may not need to be allocated to the UE when the load of the cell is full. Thus, the load contribution of the UE can potentially be negligible. In such a case, the weight $w_{k,i}$ for UE i is set to a smaller value. This situation is likely to occur in an environment containing femtocells, in which the home evolved Node B (HeNB) has a list of dedicated UEs known as the Closed Subscriber Group (CSG) UEs. The HeNB is dedicated to serve these CSG UEs. However, a HeNB could be in a hybrid mode, in which non-CSG UEs may also be served, but with limited priority or with limited services. In this case, the non-CSG UEs may be associated with a lower weight.

Figure 2:
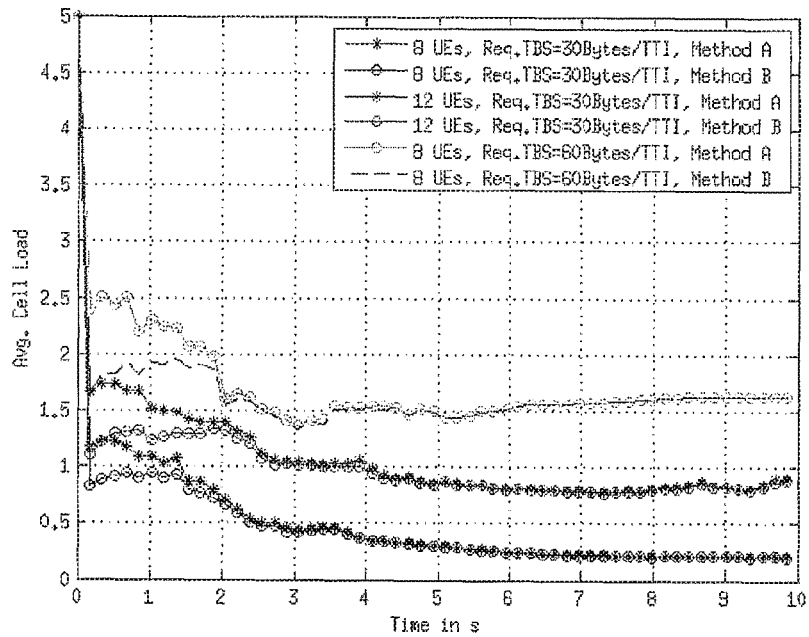
FIG. 2 is an example graphical representation of the load $\rho_k$ averaged over all cells in a system as a function of time t for different numbers of UEs and required bit rate, estimated in accordance with the disclosure.

FIG. 2 is an example graphical representation of the load $\rho_k$ averaged over all cells in a system as a function of time t for different numbers of UEs and required bit rate. The bit rate is varied by adjusting the power using a power adaptation algorithm in which the downlink power per sub-band is adapted to reduce the level of inter-cell interference. As the power adaptation algorithm adjusts the power, the user bit rate improves, which thereby reduces the load of a cell.

The graphical representation shows results obtained by calculating the load $\rho_k$ using Equation (3) and results obtained by calculating the load $\rho_k$ using Equation (5). The results obtained using Equation (3) are labelled as "Method A" and the results obtained using Equation (5) are labelled as "Method B". It can be seen that the two methods for estimating the load of a cell produce quite similar results.

As expected, when the number of UEs increases from 8 to 12 per cell, the load of the cell increases. Similarly, an increase in the load of the cell is also observed when the required bit rate is increased from 30 Bytes per Transmission Time interval (TTI) to 60 Bytes per TTI. These results are expected because a greater number of UEs or a higher required bit rate naturally means that there would be an increase in the use of limited power, time, and frequency resources, which are shared among UEs.

Ideally, when the load of a cell reaches its maximum (i.e. when the load achieves unity), all UEs should meet the required target bit rate exactly, and full power should be used. However, due to variations in the UE channel qualities, some UEs that experience severely bad channel qualities may not be able to meet the required bit rate, and thereby lower the performance of the entire cell. On the other hand, for UEs with good channel qualities, the system would lower the transmit power in order to increase power efficiency and reduce inter-cell interference. As a natural behaviour of the power adaptation algorithm, no extra power would be allocated if the UE meets the required bit rate. Thus, as expected, the average bit rate performance over all UEs in the system is slightly biased by the UEs that experience bad channel qualities.

It can be seen from the results shown in FIG. 2 that it would not be accurate to simply use the number of UEs in a cell as a measure of the cell load. A more accurate measure of the cell load can be obtained based on knowledge of the required target bit rate, the pattern of resource utilization, and the call quality.

Figure 3:
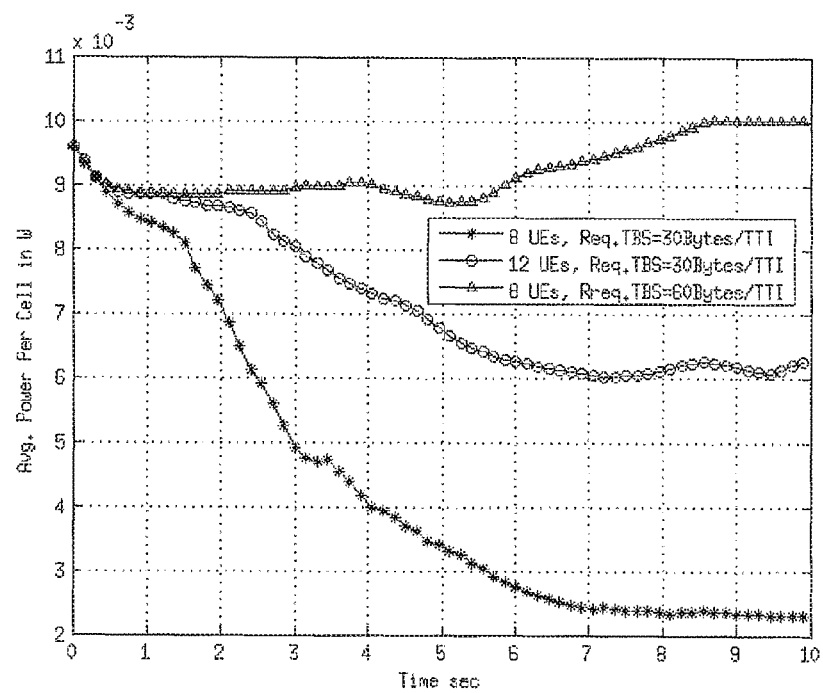
FIG. 3 is an example graphical representation of the average power $\bar{P}_{k,j}$ per cell k as a function of time t for different combinations of the number of UEs and required bit rates, estimated in accordance with the disclosure.

FIG. 3 is an example graphical representation of the power per cell averaged over all cells in the system as a function of time t for different combinations of the number of UEs and required bit rates. When the load of the cell is low, it is possible to reduce the transmit power and thereby achieve a good energy efficiency. However, as the load of the cell increases, a higher power is required. As discussed above, it is possible to define the load of the cell as the proportion of the downlink power used. However, this power-based estimation of the load of the cell does not take into account the cell performance and the level of user satisfaction. More importantly, this method is inadequate when employing traditional approaches where a fixed downlink power with fixed power spectral density is used.

As discussed earlier, the load of the cell is subject to the natural variations of the user channel qualities because the estimation of the load depends inversely on the average bit rate achieved. In the case of a macrocell environment, the load variation is more easily averaged out due to the large number of UEs in the system. However, in a femtocell environment, only a limited number of UEs are served, which means that the natural channel quality variation of each UE has a much larger impact on load estimation.

For example, in the case of admission control, a new UE is only admitted to a cell if the estimated load of this UE on the cell would not cause the total load of the cell to exceed a certain limit. If the current estimated load of the cell is not stable, and is sensitive to the instantaneous channel qualities of existing UEs, the admission success rate of the new UE would be unpredictable. Due to the low number of UEs in a femtocell environment (compared to the macrocell environment), the issue of load stability for femtocells is particularly important.

Recalling the definition of the load $\rho_k$ of a cell k expressed in Equation (3) or (5) above:

$$\rho_k(t)=(1-\beta)\rho_k(t-1)+\beta\hat{\rho}_k(t), \quad (8)$$

where the quantity $\hat{\rho}_k(t)$ is the current load of the cell estimated based on the number of existing bearers. The filter coefficient $\beta$ of the averaging filter can be adapted in order to achieve the most stable load for the cell and the fastest response. The value of $\beta$ can be adapted based on the level of variation $\chi_k(t)$ of the load $\rho_k(t)$, which is explained in more detail below. The value of $\beta$ is adjusted to ensure that the fluctuation in the averaged load is within a certain quantifiable value. It is important to achieve a stable value for the averaged load to accurately quantify the load of the system for purposes such as self-organizing network (SON) and radio resource management (RRM). If $\beta$ is set to be too large, the calculated value for the average load of the cell would be unstable. On the other hand, if $\beta$ is set to be too small, an unnecessarily slow response would result.

The level of variation $\chi_k(t)$ of the load $\rho_k(t)$ can be monitored by observing the standard deviation of the load $\sigma_k(t)$ relative to the average of the load $\bar{\rho}_k(t)$. This can be expressed as:

$$\chi_k(t) = \frac{\sigma_k(t)}{\bar{\rho}_k(t)}, \quad (9)$$

where the estimated variance (i.e. the square of the standard deviation) is given by:

$$\sigma_k^2(t) = (1-\beta_2)\sigma_k^2(t-1) + \frac{\beta_2}{\delta}(\rho_k(t)-\bar{\rho}_k(t))^2 \quad (10)$$

and where the mean of the averaged load computed by Equation (8) is given by:

$$\bar{\rho}_k(t)=(1-\beta_1)\bar{\rho}_k(t-1)+\beta_1\rho_k(t). \quad (11)$$

The level of variation $\chi_k(t)$ of the load $\rho_k(t)$ as defined in Equation (9) can also be referred to as the variability ratio. The time period over which the average of the load $\bar{\rho}_k(t)$ is estimated is implicit based on the choice of filter coefficient $\beta$.

In Equation (10), $\beta_2$ is a filter coefficient for the estimated variance of the averaged load and, in Equation (11), $\beta_1$ is a filter coefficient for the mean of the averaged load, which is itself defined in Equation (8). In Equation (8), the load is an average based on the filter coefficient $\beta$. The other filter coefficients $\beta_1$ and $\beta_2$ are separate filter coefficients that are introduced to account for further variations because even if the load is averaged according to Equation (8) using the filter coefficient $\beta$, this value of the load still fluctuates due to the channel quality of the UEs, bit rate allocations, etc. Preferably, the values of the filter coefficients $\beta_1$ and $\beta_2$ are fixed, whereas the value of the filter coefficient $\beta$ is adjusted depending on the mean of the averaged load and the variance of the averaged load, i.e. depending on the level of variation $\chi_k(t)$ of the load. However, alternatively, each filter coefficient $\beta$, $\beta_1$, and $\beta_2$ could be adaptive.

As the estimate of the variance in Equation (10) involves the mean of the averaged load which is computed by Equation (11), an offset factor $\delta$ is required to ensure that the variance is un-biased. Therefore, a quantity $\delta$ is introduced to ensure that the variance is un-biased. The quantity $\delta$ is given by:

$$\delta = \frac{2(1-\beta_1)^2}{2-\beta_1}, \quad (12)$$

as disclosed in "Estimation of Variance by a recursive equation", by M. M. Bruce, National Aeronautics and Space Administration (NASA), technical report TN D-5465, October 1969.

In the case where $\beta_1 \ll 1$, which is often assumed for smooth filtering, $\delta \approx 1$. Without much loss of generality, and for the sake of simplicity, it can be assumed that $\beta_1$ and $\beta_2$ have the same value $\beta'$, i.e. that $\beta_1=\beta_2=\beta'$.

Thus, Equations (10) and (11) respectively reduce to:

$$\sigma_k^2(t)=(1-\beta)\sigma_k^2(t-1)+\beta'(\rho_k(t)-\overline{\rho}_k(t))^2, \text{ and} \quad (13)$$

$$\overline{\rho}_k(t)=(1-\beta')\overline{\rho}_k(t-1)+\beta'\rho_k(t). \quad (14)$$

In order to address the issue of load variability, a reasonable value of $\beta$ is selected such that it is small enough to ensure that the load variability is acceptable while large enough to ensure that the system response time is acceptable. This is achieved by ensuring that the level of variation $\chi_k(t)$ of the load $\rho_k(t)$ is maintained at (or around) a certain target value by adapting $\beta$ appropriately. The target value is chosen by an operator based on the level of fluctuation of the load and the level of response time due to the changing load that is required.

Figure 4:
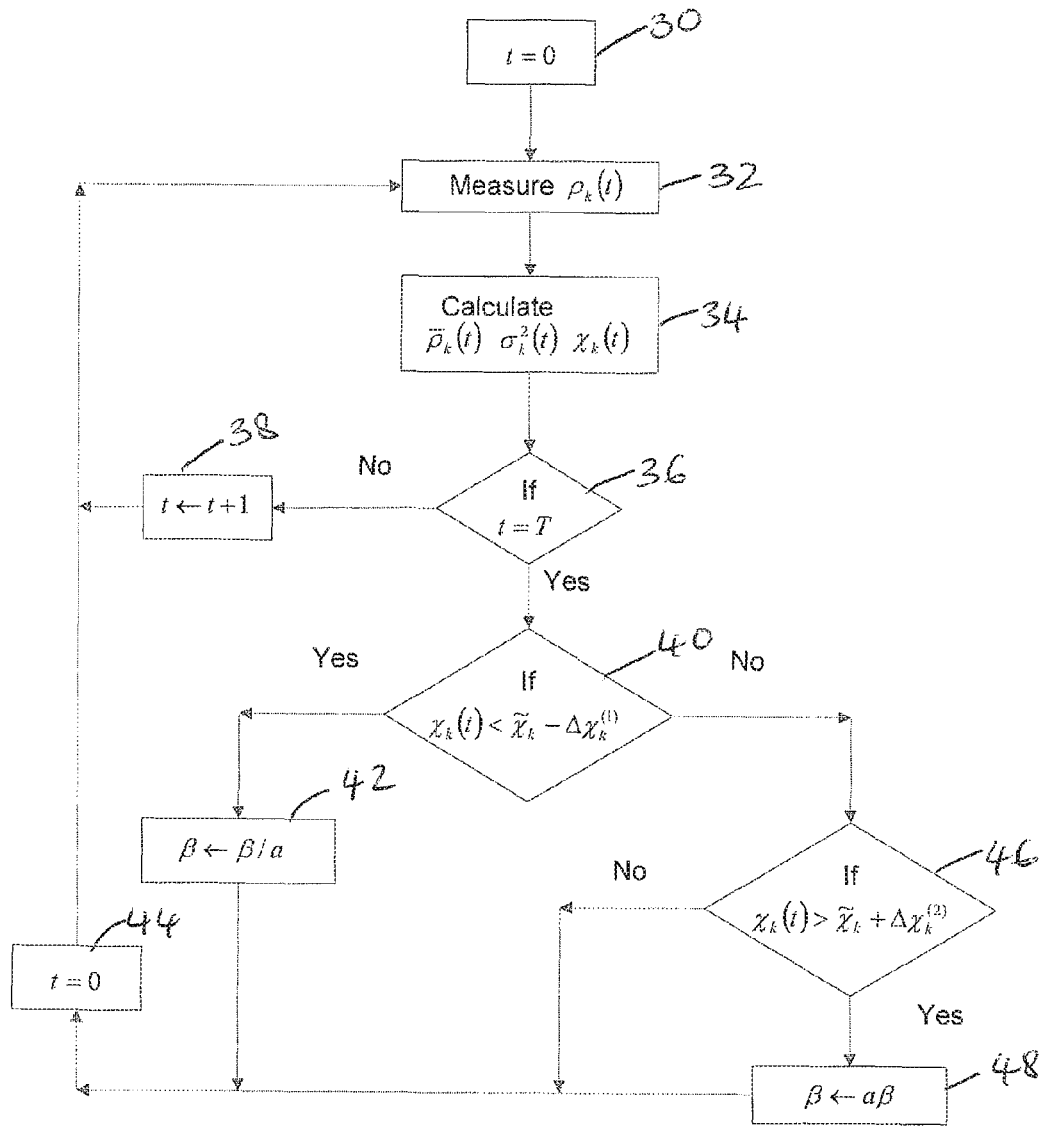
FIG. 4 is a flow chart, illustrating a process in accordance with an aspect of the present disclosure.

FIG. 4 is a flow chart, illustrating a method for adapting $\beta$ depending on the variability ratio $\chi_k(t)$ relative to some target in accordance with an aspect of the disclosure.

The method starts at time $t=0$ (step 30). In step 32, the load $\rho_k(t)$ of cell k is measured according to Equation (8). In step 34, the average of the measured load $\overline{\rho}_k(t)$ of cell k, the estimated variance $\sigma_k^2(t)$ of cell k, and the level of variation $\chi_k(t)$ of the load $\rho_k(t)$ of cell k are calculated.

The average of the measured load $\overline{\rho}_k(t)$ of cell k is calculated recursively as shown in Equation (11) using the filter coefficient $\beta_1$. This filter coefficient $\beta_1$ implicitly defines an averaging time. However, there is no explicit averaging period associated with this filtering since the filter coefficient $\beta_1$ defines how fast the effects of the current sample falls off (in an exponential manner). As an example, the averaging window size could be approximately:

$$\text{Round}\left(\frac{2}{\beta_1}\right) \text{samples},$$

where Round is a round-off function. For example, Round $(10.2)=10$.

In step 36, it is checked whether a predetermined period of time has expired, i.e. it is checked whether the time t is equal to a predetermined time T. If the predetermined period of time has not expired, the time t continues to increase (step 38) and the process of steps 32 to 36 is repeated, i.e. the load $\rho_k(t)$ of cell k is again measured, the average of the load $\overline{\rho}_k(t)$ of cell k, the estimated variance $\sigma_k^2(t)$ of cell k, and the level of variation $\chi_k(t)$ of the load $\rho_k(t)$ of cell k are calculated, and it is checked whether the predetermined time T has been reached.

Once the time t reaches the predetermined time T, it is determined whether the level of variation $\chi_k(t)$ of the load of cell k at time t is less than $\tilde{\chi}_k$ (which is a target value that quantifies the level of fluctuation of the load $\rho_k(t)$ of cell k) minus a hysteresis value $\Delta\chi_k^{(1)}$.

If the level of variation $\chi_k(t)$ of the load of cell k at time t is less than the target value $\tilde{\chi}_k$ minus the hysteresis value $\Delta\chi_k^{(1)}$, then $\beta$ is adapted by dividing it by a predetermined constant $\alpha$ (step 42), the time is reset to zero (step 44), and the process is repeated, starting with measuring the load $\rho_k(t)$ of cell k at step 32. The predetermined constant $\alpha$ is a value that is less than one, i.e. $\alpha<1$, such that when $\beta/\alpha$, the new value of $\beta$ is larger than the original value of $\beta$, i.e. $\beta$ is increased. The fact that $\beta$ is increased means that a smaller fraction will be taken of the previous value of the load and a larger fraction will be taken of the estimated current value of the load, in Equations (3) and (5).

If the level of variation $\chi_k(t)$ of the load of cell k at time t is not less than the target value $\tilde{\chi}_k$ minus the hysteresis value $\Delta\chi_k^{(1)}$, it is determined whether the level of variation $\chi_k(t)$ of the load of cell k at time t is greater than the target value $\tilde{\chi}_k$ plus a hysteresis value $\Delta\chi_k^{(2)}$.

If the level of variation $\chi_k(t)$ of the load of cell k at time t is not greater than the target value $\tilde{\chi}_k$ plus the hysteresis value $\Delta\chi_k^{(2)}$, the time is reset to zero (step 44) and the process is repeated, starting with measuring the load $\rho_k(t)$ of cell k at step 32.

If the level of variation $\chi_k(t)$ of the load of cell k at time t is greater than the target value $\tilde{\chi}_k$ plus the hysteresis value $\Delta\chi_k^{(2)}$, then $\beta$ is adapted by multiplying it by the predetermined constant $\alpha$ (step 42), the time is reset to zero (step 44) and the process is repeated, starting with measuring the load $\rho_k(t)$ of cell k at step 32. Here, the predetermined constant $\alpha$ is used to reduce the value of $\beta$ in case the fluctuation is larger than the target value $\tilde{\chi}_k$ (plus a hysteresis value $\Delta\chi_k^{(2)}$). In other words, the predetermined constant $\alpha$ is simply a multiplicative constant having a value less than 1, which is used to reduce the value of $\beta$. The fact that $\beta$ is reduced means that a larger fraction will be taken of the previous value of the load and a smaller fraction will be taken of the estimated current value of the load, in Equations (3) and (5).

If the filter coefficient $\beta$ is greater than a predetermined maximum value, i.e. if $\beta>\beta_{max}$, then the filter coefficient $\beta$ is capped to the predetermined maximum value $\beta_{max}$, if necessary. Similarly, if the filter coefficient $\beta$ is less than a predetermined minimum value, i.e. if $\beta<\beta_{min}$, then the filter coefficient $\beta$ is capped to the predetermined minimum value $\beta_{min}$, if necessary. This avoids the filter coefficient $\beta$ being set to potentially extreme values.

Figure 5A:
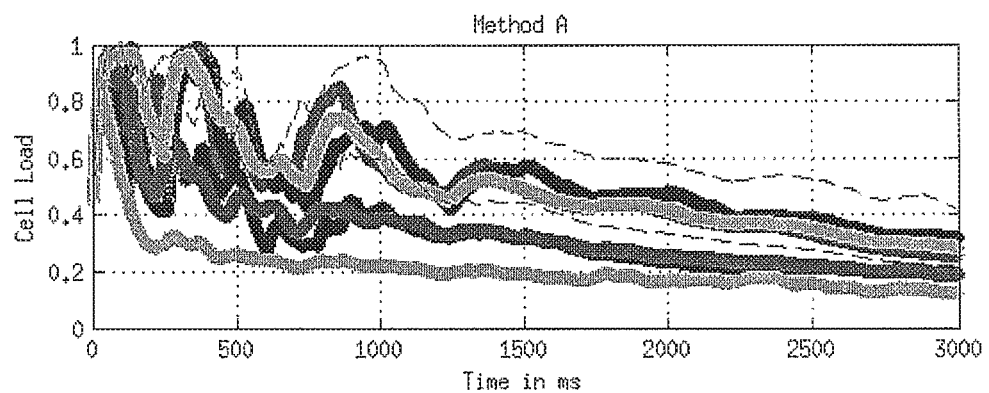
FIG. 5a is an example graphical representation of the load $\rho_k$ of a cell k as a function of time t, where the load $\rho_k$ is estimated in accordance with one aspect of the disclosure.
Figure 5B:
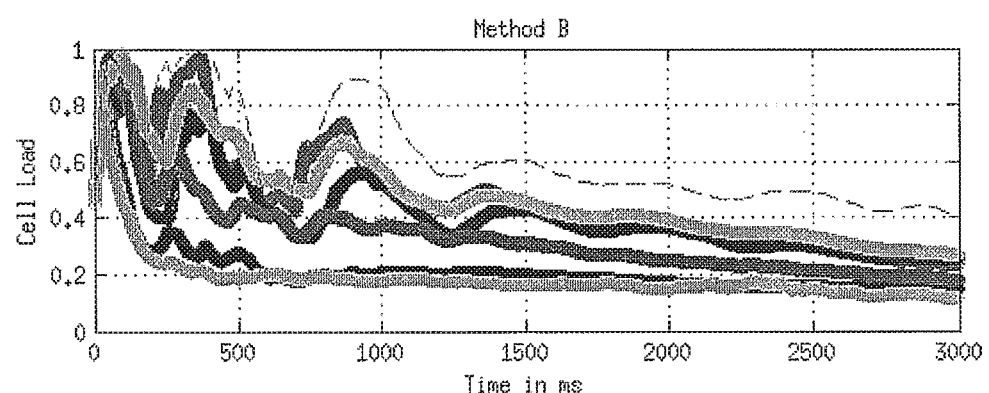
FIG. 5b is an example graphical representation of the load $\rho_k$ of a cell k as a function of time t, where the load $\rho_k$ is estimated in accordance with another aspect of the disclosure.

FIG. 5a is an example graphical representation of the load $\rho_k$ of a cell k as a function of time t, where the load $\rho_k$ is estimated using Equation (3) and FIG. 5b is an example graphical representation of the load $\rho_k$ of a cell k as a function of time t, where the load $\rho_k$ is estimated using Equation (5). The load $\rho_k$ of FIGS. 5a and 5b is the load of eight evolved Node Bs (eNBs), each eNB serving five UEs. It is assumed that both the hysteresis value $\Delta\chi_k^{(1)}$ and the hysteresis value $\Delta\chi_k^{(2)}$ are equal to zero, i.e. that $\Delta\chi_k^{(1)}=\Delta\chi_k^{(2)}=0$. It is also assumed that the target value $\tilde{\chi}_k$ is equal to 0.04 (i.e. that $\tilde{\chi}_k=0.04$), and that $\alpha=0.75$, $\beta'=0.01$, and $T=150$ ms.

Figure 6:
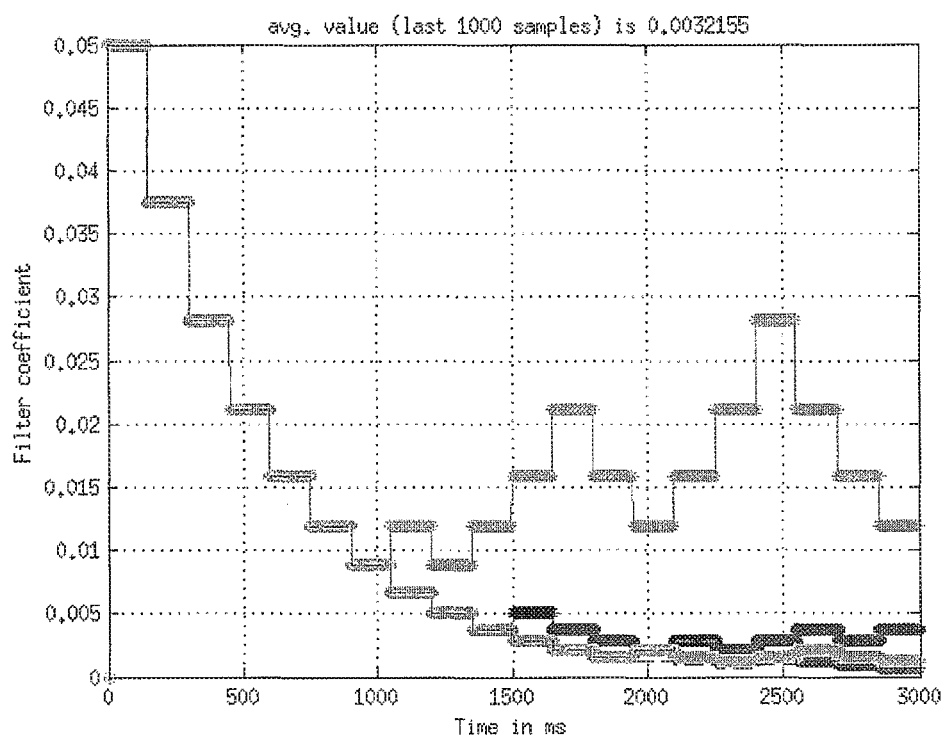
FIG. 6 is a graphical representation of the adjustment of filter coefficients of an averaging filter in accordance with the disclosure.

As can be seen in FIGS. 5a and 5b, the load variation $\chi_k(t)$ is relatively high when t is small and is reduced as the time t progresses. The reduction in the load variation $\chi_k(t)$ over time t is a result of the respective values of the filter coefficients $\beta_1$, $\beta_2$, $\beta'$ (i.e. $\beta$) adjusting themselves over time. FIG. 6 is a graphical representation of this adjustment of the filter coefficients, where each line represents a different value of filter coefficient $\beta$ for each cell k.

Figure 7A:
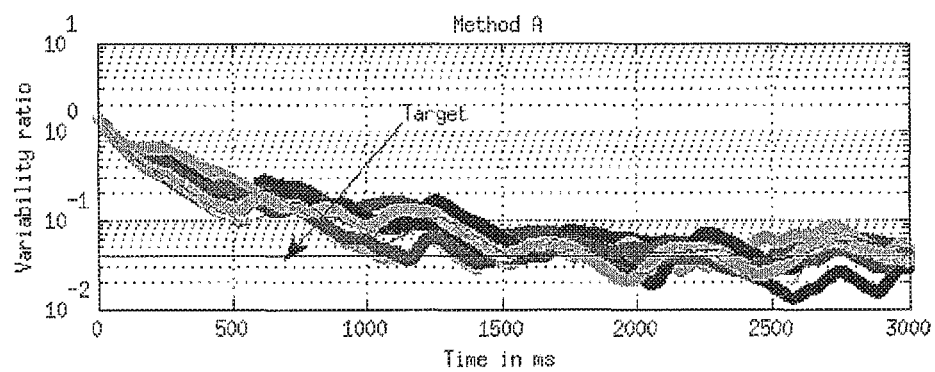
FIG. 7a is a graphical representation of the variability ratio $\chi_k(t)$ as a function of time t, where the load $\rho_k$ is estimated in accordance with one aspect of the disclosure.
Figure 7B:
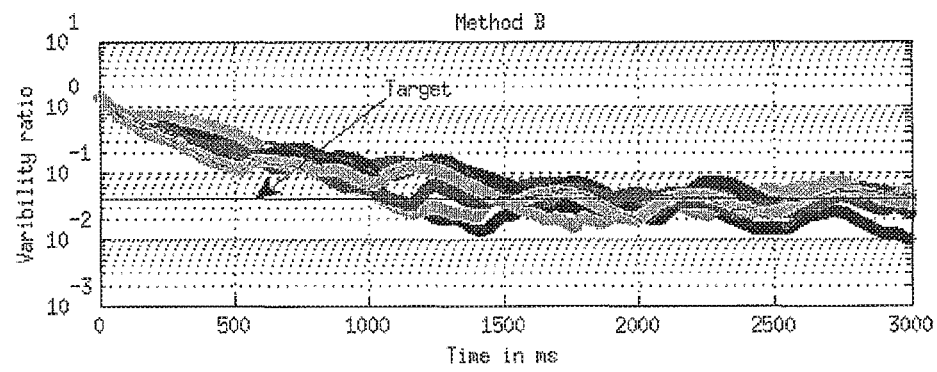
FIG. 7b is a graphical representation of the variability ratio $\chi_k(t)$ as a function of time t, where the load $\rho_k$ is estimated in accordance with another aspect of the disclosure.

FIG. 7a is a graphical representation of the variability ratio $\chi_k(t)$ estimated using Equation (9) as a function of time t, where the load $\rho_k$ is estimated using Equation (3) and FIG. 7b is a graphical representation of the variability ratio $\chi_k(t)$ estimated using Equation (9) as a function of time t, where the load $\rho_k$ is estimated using Equation (5).

As can be seen in FIGS. 7a and 7b, large load variations occur when t is small, which is as a result of the filter coefficients being set relatively high. However, as t progresses, the load variations reduce as a result of the values of the filter coefficients decreasing. In this way, it is possible to reduce the variability ratio to a value below a target level. The variability ratio is maintained at or around the target level by increasing the filter coefficients of some cells in order to start to increase the variability ratio again. As can be seen in FIGS. 7a and 7b, it is possible to maintain the variability ratio at the desired target level despite minor fluctuations.

Figure 8:
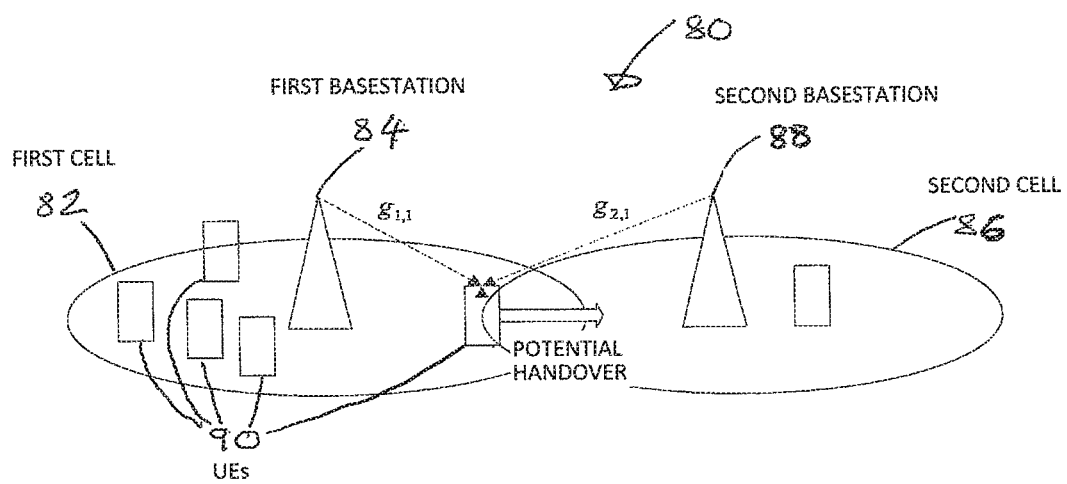
FIG. 8 illustrates a cellular communications network in an example handover situation, in accordance with the disclosure.

FIG. 8 illustrates a cellular communications network in an example handover situation, in accordance with the disclosure.

With reference to FIG. 8, the cellular communications network 80 comprises a first cell 82, which is served by a first basestation 84, and a second cell 86, which is served by a second basestation 88. In this example, the basestations 84 and 88 are evolved Node Bs (eNBs). The eNBs 84 and 88 are connected to each other via an X2 interface. The first cell 82 serves a large number of UEs 90 (i.e. the first cell 82 is said to be highly loaded).

The approach for handover provided by the disclosure involves estimating the Signal-to-Interference and Noise Ratio (SINR) of the UE that would result if the handover were carried out, taking into account sub-band specific power allocation when making this estimation, and then estimating the corresponding load of the cell. The estimations are carried out by a downlink scheduler of an eNB.

Let $P_k=(P_{k,1}, P_{k,2}, \ldots, P_{k,J})$ be a vector of downlink power for the eNB of a cell k, where $P_{k,j}$ is the power allocated to sub-band j by the eNB of cell k, and where $$P_k = \frac{1}{J}\sum_{n=1}^{J} P_{k,j}$$

Let $\gamma_{n,j}^{(k)}$ be the downlink Signal-to-Interference and Noise Ratio (SINR) at the j-th sub-band of UE n, which is served by the eNB of cell k. The SINR at the j-th sub-band of UE n can be expressed as:

$$\gamma_{n,j}^{(k)} = \frac{g_{k,n} P_{k,j}}{\sum_{k' \neq k} g_{k',n} P_{k',j} + N_0}, \quad (15)$$

where the quantity $N_0$ is the background noise power, $P_{k',j}$ is the power allocated to sub-band j by the eNB of an interfering cell k' to UE n, $g_{k',n}$ is the average downlink long-term path gain between the eNB of the interfering cell k' and the UE n, and $g_{k,n}$ is the average downlink long-term path gain between the eNB of the serving cell k (which is the serving eNB) and the UE n. The background noise power $N_0$ is assumed to be common for all UEs and could be measured, for example, via a Network Listen Mode (NLM).

The average downlink long-term path gain $g_{k,n}$ between the serving eNB of cell k and the UE n can be expressed as:

$$g_{k,n} = \frac{\bar{P}_k^{(n)}}{\hat{P}_k}, \quad (16)$$

where $\bar{P}_k^{(n)}$ is the Reference Signal Received Power (RSRP) at UE n from the serving eNB of cell k, which can be obtained via measurements taken by the UE, and where $\hat{P}_k$ is the transmit power of the reference signal, which can be obtained via the broadcast channel.

Assuming that the average downlink long-term path gain $g_{k,n}$ between the serving eNB of cell k and the UE n, the average downlink long-term path gain $g_{k',n}$ between the eNB of interfering cell k' and the UE n, and the background noise power $N_0$ are known, the calculation of $\gamma_{n,j}^{(k)}$ requires knowledge of the power $P_{k,j}$ allocated to sub-band j by the eNB of serving cell k and knowledge of the power $P_{k',j}$ allocated to sub-band j by the eNB of interfering cell k'.

As mentioned previously, the UE n can measure the RSRP and can report the RSRP back to the serving eNB of cell k. However, the UE n does not have the capability to measure the sub-band specific received power, nor does the broadcast channel provide the sub-band specific transmit power information.

It is possible to obtain sub-band specific information of neighbouring cells via the interface that connects the basestations of those cells (the X2 interface). The sub-band specific information could be sent as part of a Relative Narrowband Transmit Power (RNTP) information element that is included in a Load Indication message sent by the basestations of the neighbouring cells. Essentially, the sub-band specific information consists of a bitmap of T bits, which correspond to T physical resource blocks (PRBs). A zero at PRB index i corresponds to a transmit power that is below a specified threshold $P_{th}$, and a one at PRB index i corresponds to a transmit power that is above the specified threshold $P_{th}$.

The downlink scheduler operates at a frequency resolution of a sub-band, which consists of a multiple of PRBs. Also, it is assumed that the algorithm used to adapt power operates in a resolution of sub-bands. Therefore, for the sake of simplicity without the loss of generality, a bitmap of J sub-bands instead of T PRBs is assumed.

Furthermore, it is assumed that the system is operating under a dynamic frequency reuse scheme which has the flexibility to allocate a low power level $P_k^{(l)}$ and a high power level $P_k^{(h)}$ for cell k to different sub-bands within a total of J sub-bands, where $$0 \leq P_k^{(l)} \leq P_{th} \leq P_k^{(h)} \leq P_k. \quad (17)$$

Then, the ratio of the high power level to the low power level is defined as $$r_k = \frac{P_k^{(h)}}{P_k^{(l)}},$$

and the RNTP bitmap is given by:

$$\eta_k = (\eta_{k,1}, \eta_{k,2}, \ldots, \eta_{k,J}) \quad (18)$$

From Equation (18), the power $P_{k',j}$ allocated to sub-band j by the eNB of interfering cell k' can be expressed as:

$$P_{k',j} = \begin{cases} r_k \cdot P_{k'}^{(l)} & \text{if } \eta_{k',j} = 1 \\ P_{k'}^{(l)} & \text{if } \eta_{k',j} = 0 \end{cases} \quad (19)$$

where

-continued $$P_{k'}^{(l)} = \frac{P_k}{(J - |\eta_{k'}|) + r_{k'}|\eta_{k'}|} \quad (20)$$

where $|\eta_{k'}|$ is the magnitude of the vector $\eta_{k'}$.

The same procedure applies to compute the power $P_{k,j}$ allocated to sub-band j by the eNB of serving cell k, except that the vector $\eta_k$ is known internally by the eNB of serving cell k, which means that extra transmissions over the X2 interface are unnecessary.

If the target eNB of a neighbour cell k* decides to serve the UE selected for handover using the low and high power sub-bands, the average bit rate $R_{k^*}$ for neighbour cell k* per low power sub-band l and per high power sub-band h can respectively be expressed as:

$$R_{k^*}^{(l)} = \frac{\alpha^{(l)}}{|\Omega_{k^*}^{(l)}|} \sum_{j \in \Omega_{k^*}^{(l)}} f(\gamma_{n,j}^{(k^*)}), \quad (21)$$

and $$R_{k^*}^{(h)} = \frac{\alpha^{(h)}}{|\Omega_{k^*}^{(h)}|} \sum_{j \in \Omega_{k^*}^{(h)}} f(\gamma_{n,j}^{(k^*)}), \quad (22)$$

where $\Omega_{k^*}^{(l)}$ corresponds to the set of sub-band indices allocated with the low power level $P_{k^*}^{(l)}$ for neighbour cell k* and $\Omega_{k^*}^{(h)}$ corresponds to the set of sub-band indices allocated with the high power level $P_{k^*}^{(h)}$ for neighbour cell k*. The term $\alpha^{(l)}$ corresponds to an estimate of the number of sub-bands used for UEs transmitting at the low power level for neighbour cell k* and the term $\alpha^{(h)}$ corresponds to an estimate of the number of sub-bands used for UEs transmitting at the high power level for neighbour cell k*. If it is not possible to estimate the number of sub-bands used for UEs transmitting at the low and high power levels, the estimates can simply be set to 1.

One example of the function $f(\gamma_{n,j}^{(k^*)})=f(x)$ could be the Shannon's formula, which is given by:

$$f(x) = \log_2\left(1 + \frac{x}{C}\right),$$

where the constant C models the gap from a theoretical maximum information transfer rate of a channel (known as the Shannon limit), for a particular noise level.

Subsequently, the approximation of the potential load contribution of the UE to the target eNB of the neighbour cell k* is given by:

$$\Delta\rho_{n,k^*} = \frac{1}{2} \frac{\tilde{R}_n}{P_{k^*}} \left( \frac{P_{k^*}^{(h)}}{R_{k^*}^{(h)}} + \frac{P_{k^*}^{(l)}}{R_{k^*}^{(l)}} \right) \quad (23)$$

In a typical scenario, the target eNB would normally allocate sub-bands with a higher power to UEs at the edge of the cell (cell-edge UEs). Thus, the potential load contribution may be reduced to:

$$\Delta\rho_{n,k^*} = \frac{\tilde{R}_n}{P_{k^*}} \frac{P_{k^*}^{(h)}}{R_{k^*}^{(h)}}. \quad (24)$$

If the sum of current total load at the target neighbour cell k* plus the potential load contribution due to UE n is below a certain threshold, the serving cell k would then handover UE n to target neighbour cell k*. It is noted that the target neighbour cell k* is assumed to perform its own admission control before user n is admitted officially. However, this load contribution at the serving cell k would reduce the potentially unnecessary signalling by eliminating unrealistic handovers.

What is claimed is:

1. A method for estimating a load imparted on a cell in a cellular communications network by user equipments in the cell, the method comprising:
    calculating an average power of the cell;
    calculating a bit rate achieved for each currently scheduled user equipment in the cell;
    estimating a current value of the load imparted on the cell as a sum, taken over each user equipment in the cell, of required bit rates for the user equipments divided by the calculated achieved bit rate for the cell, with the sum multiplied by the calculated average power of the cell divided by a product of a maximum power available in the cell and a number of currently scheduled user equipments in the cell;
    determining an actual load imparted on the cell as a sum of a fraction taken of a previous value of the load imparted on the cell and a fraction taken of the estimated current value of the load imparted on the cell; and
    adjusting the fraction taken of the previous value of the load and the fraction taken of the estimated current value of the load, wherein the adjusting comprises:
        calculating a variability of the estimated current value of the load imparted on the cell; and
        adjusting the fraction taken of the previous value of the load and the fraction taken of the estimated current value of the load based on the calculated variability of the estimated current value of the load imparted on the cell.

2. The method of claim 1, wherein the sum of the calculated achieved bit rates for each currently scheduled user equipment in the cell comprises the sum of the calculated achieved bit rates for each currently scheduled user equipment in the cell or the sum of the calculated achieved bit rates for each active user equipment in the cell.

3. The method of claim 1, further comprising:
    wherein the sum of the fraction taken of the previous value of the load and the fraction taken of the estimated current value of the load equals 1.

4. The method of claim 1, wherein the adjusting further comprises:
    determining whether the calculated variability of the estimated current value of the load imparted on the cell is less than a target value minus a first hysteresis value; and
    reducing the fraction taken of the previous value of the load and increasing the fraction taken of the estimated current value of the load based on a determination that the calculated variability is less than the target value minus the first hysteresis value.

5. The method of claim 1, wherein the adjusting further comprises:
    determining whether the calculated variability of the estimated current value of the load imparted on the cell is less than a target value minus a first hysteresis value; and determining whether the calculated variability is greater than the target value plus a second hysteresis value based on a determination that the calculated variability is not less than the target value minus the first hysteresis value;

repeating the previous steps based on a determination that the calculated variability is not greater than the target value plus the second hysteresis value; and increasing the fraction taken of the previous value of the load and reducing the fraction taken of the estimated current value of the load based on a determination that the calculated variability is greater than the target value plus the second hysteresis value.

6. The method of claim 1, wherein the variability of the estimated current value of the load imparted on the cell is calculated as a standard deviation of the estimated current value of the load imparted on the cell divided by a mean of the determined current value of the load imparted on the cell.

7. The method of claim 1, wherein calculating the bit rate achieved for each currently scheduled user equipment in the cell comprises at least one of:

calculating the bit rate achieved for a particular user equipment as a fraction taken of a previous value of the bit rate achieved for the particular user equipment based on a determination that the particular user equipment is not currently scheduled; and calculating the bit rate achieved for a particular user equipment as the sum of a fraction taken of a previous value of the bit rate achieved for the particular user equipment and a fraction taken of a current bit rate allocated to the particular user equipment based on a determination that the particular user equipment is currently scheduled, wherein the sum of the fraction taken of the previous value of the bit rate achieved for the particular user equipment and the fraction taken of the current bit rate allocated to the particular user equipment equals 1.

8. A basestation for estimating a load imparted on a cell in a cellular communications network by user equipments in the cell, the basestation comprising a processor and a memory and configured for:

calculating an average power of the cell;

calculating a bit rate achieved for each currently scheduled user equipment in the cell;

estimating a current value of the load imparted on the cell as a sum, taken over each user equipment in the cell, of required bit rates for the user equipments divided by the calculated achieved bit rate for the cell, with the sum multiplied by the calculated average power of the cell divided by a product of a maximum power available in the cell and a number of currently scheduled user equipments in the cell;

determining an actual load imparted on the cell as a sum of a fraction taken of a previous value of the load imparted on the cell and a fraction taken of the estimated current value of the load imparted on the cell; and adjusting the fraction taken of the previous value of the load and the fraction taken of the estimated current value of the load, wherein the adjusting comprises:

calculating a variability of the estimated current value of the load imparted on the cell; and adjusting the fraction taken of the previous value of the load and the fraction taken of the estimated current value of the load based on the calculated variability of the estimated current value of the load imparted on the cell.

9. The basestation of claim 8, wherein the sum of the calculated achieved bit rates for each currently scheduled user equipment in the cell comprises the sum of the calculated achieved bit rates for each currently scheduled user equipment in the cell or the sum of the calculated achieved bit rates for each active user equipment in the cell.

10. The basestation of claim 8,
wherein the sum of the fraction taken of the previous value of the load and the fraction taken of the estimated current value of the load equals 1.

11. The basestation of claim 8, wherein the adjusting further comprises:

determining whether the calculated variability of the estimated current value of the load imparted on the cell is less than a target value minus a first hysteresis value; and reducing the fraction taken of the previous value of the load and increasing the fraction taken of the estimated current value of the load based on a determination that the calculated variability is less than the target value minus the first hysteresis value.

12. The basestation of claim 8, wherein the adjusting further comprises:

determining whether the calculated variability of the estimated current value of the load imparted on the cell is less than a target value minus a first hysteresis value; and determining whether the calculated variability is greater than the target value plus a second hysteresis value based on a determination that the calculated variability is not less than the target value minus the first hysteresis value;

repeating the previous steps based on a determination that the calculated variability is not greater than the target value plus the second hysteresis value; and increasing the fraction taken of the previous value of the load and reducing the fraction taken of the estimated current value of the load based on a determination that the calculated variability is greater than the target value plus the second hysteresis value.

13. The basestation of claim 8, wherein the variability of the estimated current value of the load imparted on the cell is calculated as a standard deviation of the estimated current value of the load imparted on the cell divided by a mean of the determined current value of the load imparted on the cell.

14. The basestation of claim 8, wherein calculating the bit rate achieved for each currently scheduled user equipment in the cell comprises at least one of:

calculating the bit rate achieved for a particular user equipment as a fraction taken of a previous value of the bit rate achieved for the particular user equipment based on a determination that the particular user equipment is not currently scheduled; and calculating the bit rate achieved for a particular user equipment as the sum of a fraction taken of a previous value of the bit rate achieved for the particular user equipment and a fraction taken of a current bit rate allocated to the particular user equipment based on a determination that the particular user equipment is currently scheduled, wherein the sum of the fraction taken of the previous value of the bit rate achieved for the particular user equipment and the fraction taken of the current bit rate allocated to the particular user equipment equals 1.

15. A computer program product to estimate a load imparted on a cell in a cellular communications network by user equipments in the cell, the computer program product comprising a non-transitory storage medium comprising instructions executable by a processor associated with a basestation for the cellular communications network, wherein the basestation operates to:
- calculate an average power of the cell;
- calculate a bit rate achieved for each currently scheduled user equipment in the cell;
- estimate a current value of the load imparted on the cell as a sum, taken over each user equipment in the cell, of required bit rates for the user equipments divided by the calculated achieved bit rate for the cell, with the sum multiplied by the calculated average power of the cell divided by a product of a maximum power available in the cell and a number of currently scheduled user equipments in the cell;
- determine an actual load imparted on the cell as a sum of a fraction taken of a previous value of the load imparted on the cell and a fraction taken of the estimated current value of the load imparted on the cell; and
- adjust the fraction taken of the previous value of the load and the fraction taken of the estimated current value of the load, wherein to adjust the fraction taken of the previous value of the load and the fraction taken of the estimated current value of the load, the basestation operates to:
  - calculate a variability of the estimated current value of the load imparted on the cell; and
  - adjust the fraction taken of the previous value of the load and the fraction taken of the estimated current value of the load based on the calculated variability of the estimated current value of the load imparted on the cell.

16. The computer program product of claim 15, wherein the sum of the fraction taken of the previous value of the load and the fraction taken of the estimated current value of the load equals 1.

17. The computer program product of claim 15, wherein the sum of the calculated achieved bit rates for each currently scheduled user equipment in the cell comprises the sum of the calculated achieved bit rates for each currently scheduled user equipment in the cell or the sum of the calculated achieved bit rates for each active user equipment in the cell.

18. The computer program product of claim 15, further comprising instructions executable by the processor associated with the basestation for the cellular communications network, wherein to adjust the fraction taken of the previous value of the load and the fraction taken of the estimated current value of the load, the basestation operates to:
- determine whether the calculated variability of the estimated current value of the load imparted on the cell is less than a target value minus a first hysteresis value; and
- reduce the fraction taken of the previous value of the load and increasing the fraction taken of the estimated current value of the load based on a determination that the calculated variability is less than the target value minus the first hysteresis value.

19. The computer program product of claim 15, further comprising instructions executable by the processor associated with the basestation for the cellular communications network, wherein to adjust the fraction taken of the previous value of the load and the fraction taken of the estimated current value of the load, the basestation operates to:
- determine whether the calculated variability of the estimated current value of the load imparted on the cell is less than a target value minus a first hysteresis value; and
- determine whether the calculated variability is greater than the target value plus a second hysteresis value based on a determination that the calculated variability is not less than the target value minus the first hysteresis value;
- repeat the previous steps based on a determination that the calculated variability is not greater than the target value plus the second hysteresis value; and
- increase the fraction taken of the previous value of the load and reducing the fraction taken of the estimated current value of the load based on a determination that the calculated variability is greater than the target value plus the second hysteresis value.

20. The computer program product of claim 15, wherein the variability of the estimated current value of the load imparted on the cell is calculated as a standard deviation of the estimated current value of the load imparted on the cell divided by a mean of the determined current value of the load imparted on the cell.

* * * * *